UNITED STATES PATENT OFFICE.

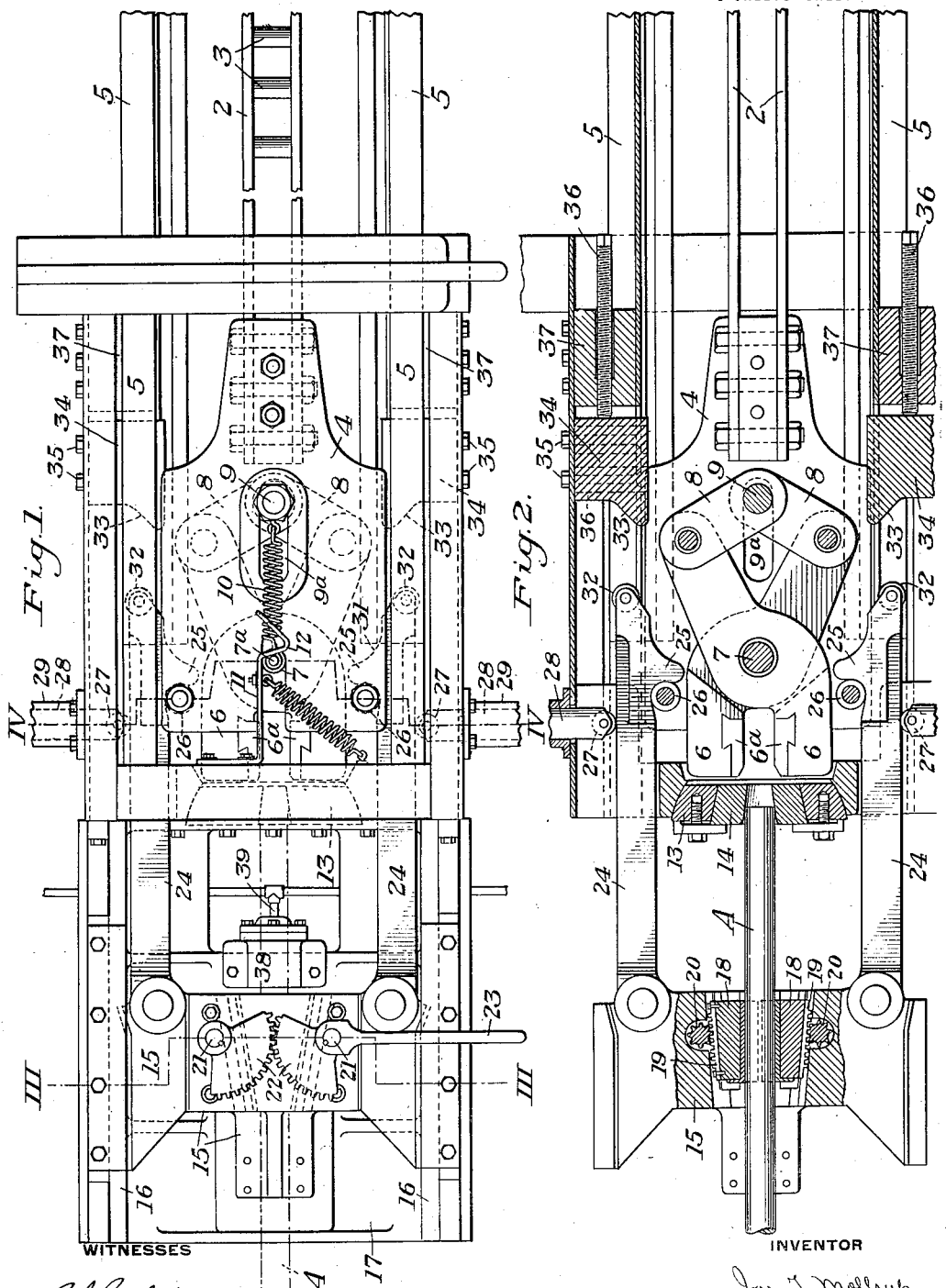

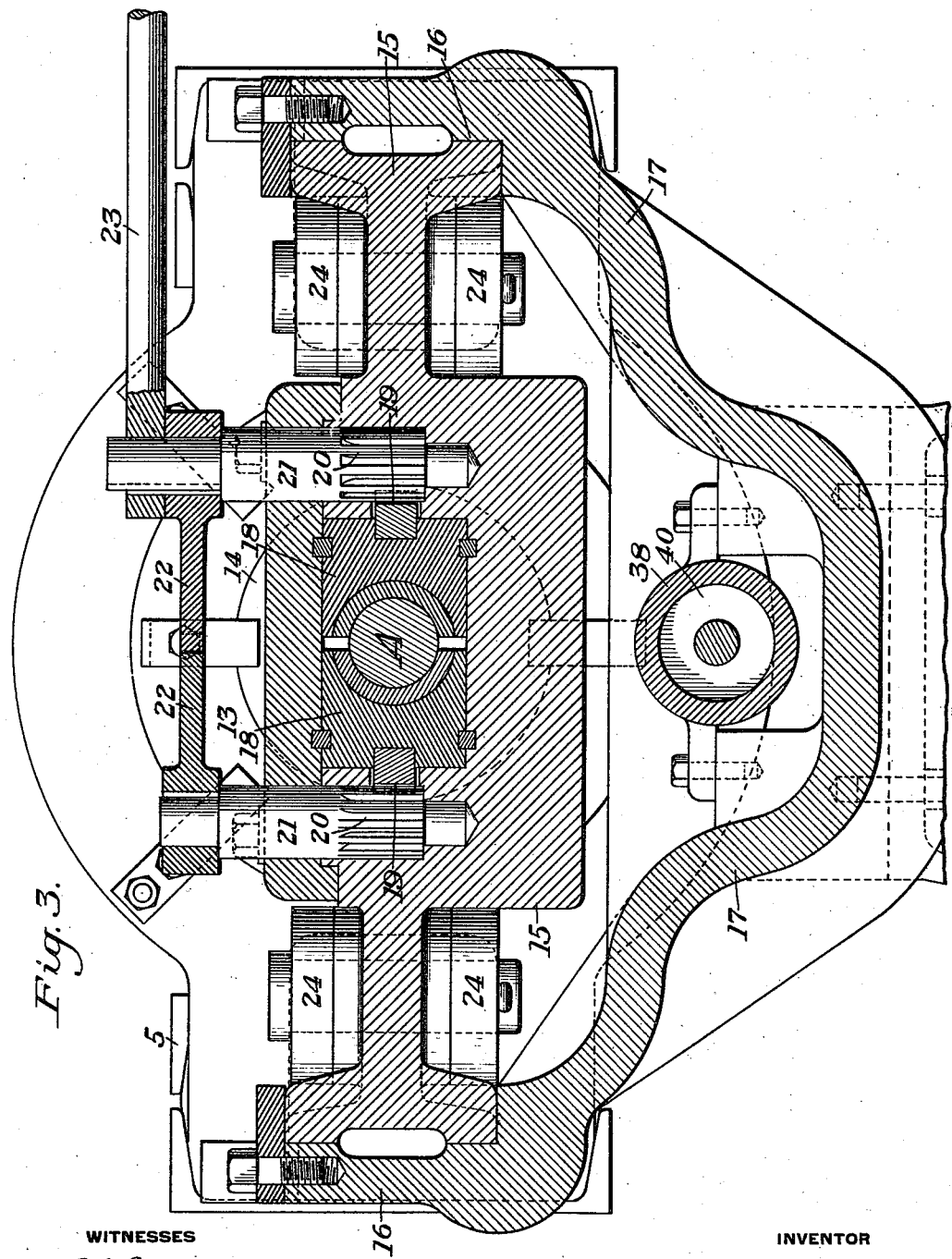

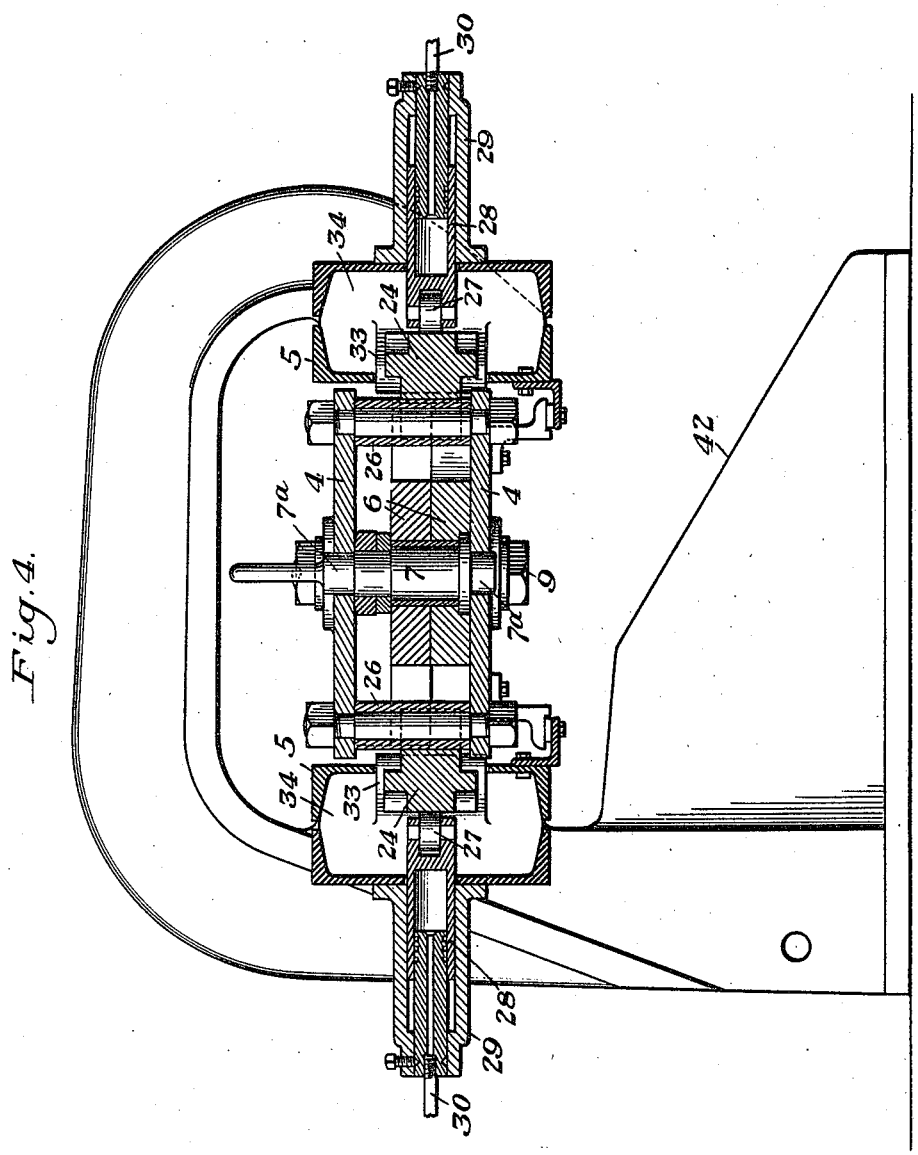

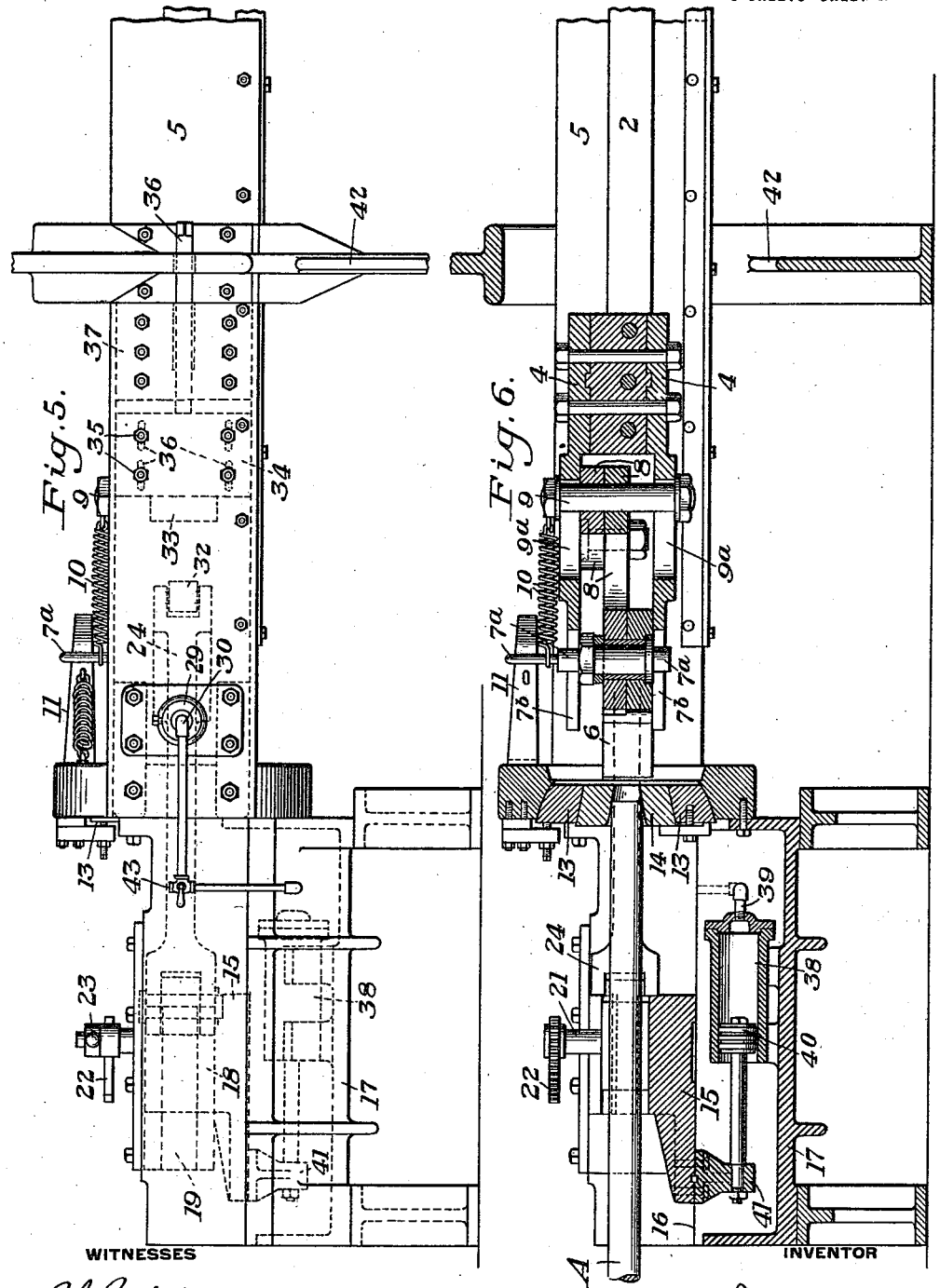

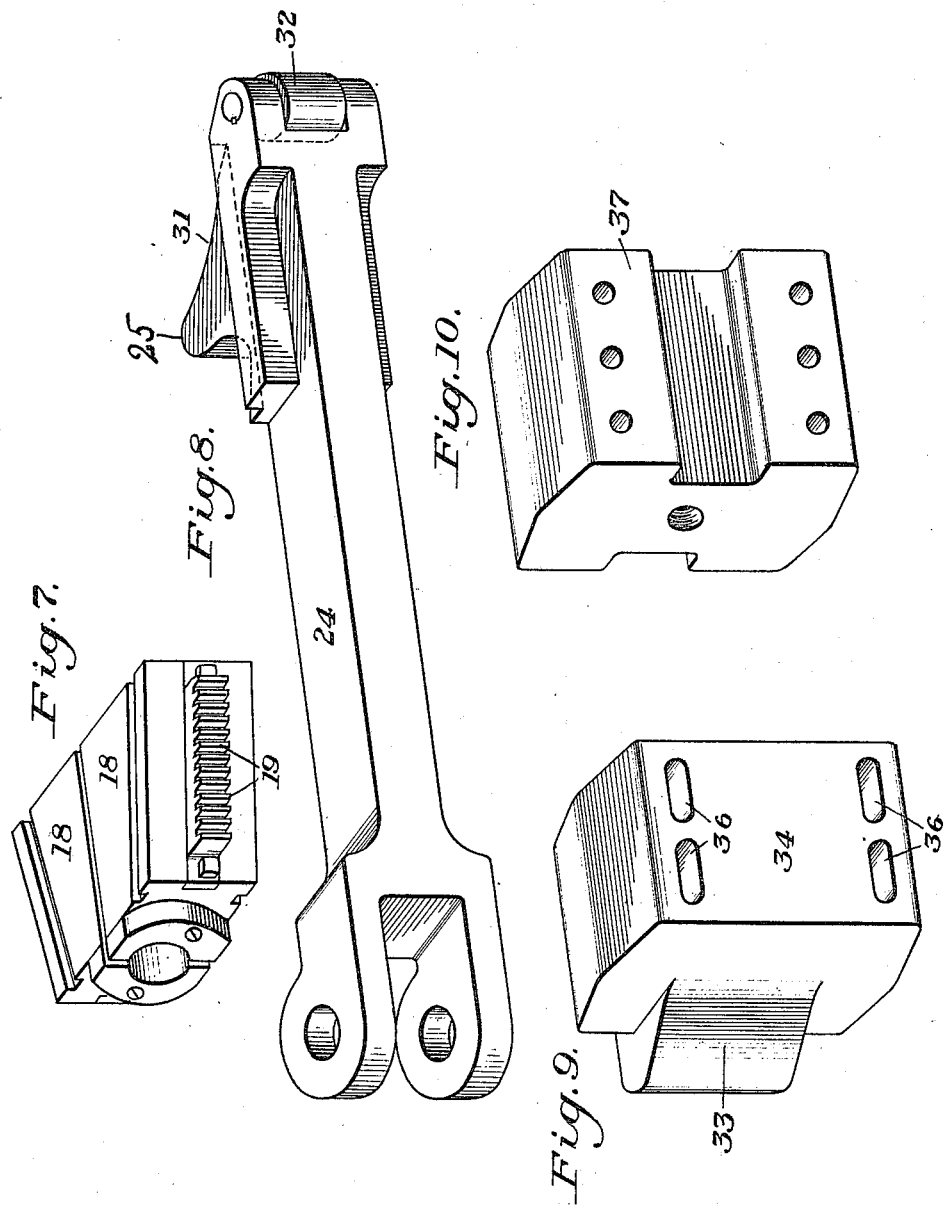

JAMES T. MOLTRUP, OF BEAVER FALLS, PENNSYLVANIA.

APPARATUS FOR DRAWING RODS.

1,298,999.      Specification of Letters Patent.      Patented Apr. 1, 1919.

Application filed July 5, 1918. Serial No. 243,381.

*To all whom it may concern:*

Be it known that I, JAMES T. MOLTRUP, a citizen of the United States, residing at Beaver Falls, in the county of Beaver and State of Pennsylvania, have invented a new and useful Improvement in Apparatus for Drawing Rods, of which the following is a full, clear, and exact description, reference being had to the accompanying drawings, forming part of this specification, in which—

Figure 1 is a plan view of rod drawing apparatus embodying my invention.

Fig. 2 is a sectional plan view of the same, with certain of the parts removed.

Figs. 3 and 4 are transverse sections taken on the lines III—III and IV—IV, respectively, of Fig. 1, but on a larger scale than Fig. 1.

Fig. 5 is a side elevation.

Fig. 6 is a longitudinal vertical section, and

Figs. 7, 8, 9 and 10 are detail perspective views of certain of the parts hereinafter more fully described.

This invention relates to an improvement in apparatus for drawing rods; and is designed to provide means whereby a separate operation of pointing the rods to enable them to be inserted through the reducing die and into engagement with the grips of the draw bar is obviated.

My invention provides drawing apparatus which is provided with an auxiliary gripping device adapted to grip the rods to be drawn in advance of the reducing die and force them through such die in position to be engaged by the draw bar grips, together with connections whereby the auxiliary grip is operated by the movement of the draw bar, and clutch mechanism for automatically engaging and disengaging the auxiliary grip at the proper times.

The nature of my invention will be best understood by reference to the accompanying drawings in which I have shown a preferred embodiment thereof, and which will now be described, it being premised, however, that various changes can be made in the details of construction, arrangement and combination of the several parts, without departing from the spirit and scope of my invention, as defined in the appended claims.

In these drawings, the numeral 2 designates the draw bar which may be actuated in any manner usual in the art. In the drawings I have indicated said bar as provided with a rack 3 for engagement with an actuating pinion in the well known manner. 4 designates the draw head which is secured to the forward end of the draw bar and which is mounted for reciprocation between the longitudinal guides 5. 6 designates a rod gripping device, comprising the two jaws interpivoted upon the pin 7 and having their power arms connected by the toggle links 8, which are in turn connected by the vertical pin 9. The pin 7 is provided with end extensions 7ª (see Fig. 6) which extend into guide slots 7ᵇ in the draw head 4. The pin 9 is mounted for back and forth movement in the longitudinal slots 9ª in the draw head. 10 designates a spring connecting the pins 7 and 9 and which acts to normally hold the gripping jaws 6 in open position. This may be further insured by the provision of the safety spring catch 11 having a bent catch portion 12 over which the pin 7 may ride as it approaches the limit of its forward movement, after which said pin slips behind said catch, in the manner shown in Fig. 1.

13 designates a die block or holder for the reducing die 14. The die 14 is made removable, and the grip jaws 6 are preferably provided with removable grips 6ª, to enable these parts to be readily removed and replaced to adapt the apparatus to different sizes and shapes of rods.

15 designates an auxiliary grip carriage placed in front of the reducing die and mounted for movement toward and away from said die in suitable guides 16 on the stationary frame 17. The carriage 15 has a longitudinal opening therein, in which are seated the auxiliary gripping jaws 18 (shown in detail in Fig. 7.) These jaws are longitudinally tapered at their outer edges, and the walls of the opening in which they are seated are similarly tapered so that the jaws will be closed upon each other as they are moved forward in said opening and will be opened away from each other when moved backward in said opening. They may be moved to effect their opening and closing by any suitable means. In the drawings I have shown them as provided with lateral rack teeth 19 which are engaged by toothed pinions 20. The shafts 21 of these pinions are intergeared by means of the toothed sectors 22, as best shown in Fig. 1; and the shaft of one of these pinions 21 is provided with an actuating lever 23, It will readily be understood that as this lever is moved, the jaws 18 will be moved correspondingly backward or forward to open or close them upon the rod A which is to be drawn.

Pivoted to the carriage 15 are two backwardly extending clutch links 24 (one of which is shown in detail in Fig. 8). At its rear end each of these clutch links 24 is provided with a hook-forming projection 25 which is adapted for engagement with a roller pin or stud 26 which is mounted in the draw head 4. This engagement, as will be readily understood by reference to Fig. 2, forms means whereby the carriage 15 may be temporarily connected to the draw head 4. The links are held in this engaging position by means of suitable yielding guiding devices. In the form shown, these guiding devices consist of rollers 27 which are carried each by a plunger 28 working in a cylinder 29 having a supply connection at 30 with a source of compressed air or other motive fluid. The rear face of each of the hook projections 25 is curved and inclined as indicated at 31 so that upon the forward or reverse movement of the draw head 4, these projections will ride past the rollers 26. Each of the links 24 has journaled thereto a trip roller 32 which, as the parts move rearwardly, is arranged to engage the cam surfaces 33 of a trip block 34. One of these blocks is shown in detail in Fig. 9. These blocks are secured in the frame of the drawing apparatus by means of bolts 35 which pass through slots 36 in the blocks, thereby permitting forward and backward adjustment of said blocks under the action of the adjusting screws 36 seated in fixed blocks 37. 38 designates a power cylinder which is fixedly secured in the frame 17 which supports the auxiliary grip carriage, in the manner best shown in Figs. 3 and 6. This cylinder is provided with a supply pipe 39 leading to a source of compressed air or other motive fluid. The piston 40 of this cylinder has its rod connected to a tail-piece or lug 41 on the auxiliary grip carriage 15.

The operation is as follows:

The rod A to be drawn is inserted through the auxiliary grips 18 and into the reducing die 14. The lever 23 is then actuated to close the grips 18 and the draw bar is actuated, the parts then being in the positions shown in Fig. 2. The first part of the rearward movement of the draw bar, through the engagement of the rollers 26 with the links 24, moves the grip carriage 15 rearwardly and thereby forces the rod A through the aperture of the reducing die and into position between the grip jaws 6. During this part of the movement the grip jaws 6 remain open as the pin 9 moves idly in the slots 9a in the draw head. When the rollers 32 on the links 24 contact with the cam surfaces 33, said links are thereby spread laterally sufficiently to cause their hooks 25 to disengage the rollers 26, thereby disconnecting the auxiliary grip carriage from the draw head. At this time the forward end of the slots 9a contact with the pins 9 and the grips 6 are closed upon the rod and said grips move rearwardly with the draw head. The rod is then drawn through the die in the usual manner. It will be noted from the drawing that the grip 6 will close upon the rod before the latter is released by the grips 18. The rod is therefore moved continuously through the die without the necessity for stopping it between the pointing and drawing operations. At the end of the draw, the grips open and the drawn piece drops downwardly and is automatically discharged from the machine on the inclined rollway 42 (see Fig. 4). As the draw head approaches the limit of its return movement, the rollers 26 ride over the hooks 25 and re-establish the actuating connections with the auxiliary grip carriage. The latter has, in the meantime, been returned to its initial position by the action of the cylinder 38. In practice the control valve 43 for its cylinder (see Fig. 5) is left partially open so as to admit some pressure to the cylinder. When the auxiliary carriage moves rearwardly, the air in the cylinder and in the supply connection between the cylinder and the valve 43 is compressed. As soon as the links 24 are disengaged from the draw head 4, the expansion of this compressed air is sufficient to actuate the piston 40 to return the carriage 15 to its initial position.

The advantages of my invention will be apparent to those familiar with this art. By obviating the necessity for separate pointing operations, the time and labor required in such operations and in the additional handling of the rods thereby involved, is very greatly reduced. The pointing of the rods and their insertion through the reducing die is effected automatically by the usual operation of the draw bar. The attachments by which this is effected are simple in construction and positive in their mode of operation. There is also a minimum waste due to deformation of the die-entering ends of the rods.

It will be readily understood that my invention is applicable to various forms of drawing machines; that the latter may be provided with any usual or suitable gripping and actuating mechanisms; and that the particular arrangement of the auxiliary grips and the manner of their connection and disconnection with the draw head may be changed within the scope of the appended claims.

I claim:

1. Apparatus for drawing rods and the like, the combination with a die, a main grip for drawing the rods through the die, an auxiliary grip arranged to grip the rods and force them into and through the die, a movable carrier for said grips, and means for connecting the auxiliary grip to the moving means and for disconnecting it therefrom, said grips having means whereby the main grip will engage the rod before it is released by the auxiliary grip, substantially as described.

2. In rod-drawing apparatus, the combination with a reducing die and drawing apparatus for drawing the rods through such die, of an auxiliary grip arranged to grip the rods in front of the die, and actuating connections between said auxiliary grip and the drawing apparatus, together with means actuated by the movement of the auxiliary grip for automatically connecting and disconnecting the auxiliary grip to and from the drawing apparatus, substantially as described.

3. In combination with a reducing die, a draw head and grips mounted on the draw head and arranged to pull the rods to be drawn through such die, of an auxiliary grip mounted in front of the die, means for connecting and disconnecting the auxiliary grip to and from the draw head, means whereby the grips on the draw head remain open until the auxiliary grips have forced the rod through the die, and means for then closing the first named grips, substantially as described.

4. Rod-drawing apparatus, comprising a draw head, main grips mounted on the draw head, an auxiliary grip carriage mounted in front of said die and having rod grips, means for opening and closing the auxiliary grips, and clutch members connected to the auxiliary grip carriage and adapted to engage and disengage the draw head, together with means for effecting such engagement and disengagement at the proper times, substantially as described.

5. Rod-drawing apparatus, comprising a draw head, main grips mounted on the draw head, an auxiliary grip carriage mounted in advance of the die and movable longitudinally toward and away from the same, auxiliary grips on said carriage, means for opening and closing said grips, links connected to the auxiliary grip carriage and having means for engaging and disengaging the draw head, and means whereby the main grips are held open during the initial part of the backward movement of the draw head and are subsequently automatically closed, substantially as described.

6. Rod-drawing apparatus, comprising a reducing die, a reciprocating draw head for pulling the rods through such die, main grips mounted on the draw head, studs also carried by the draw head, an auxiliary grip carriage mounted in front of the reducing die and movable toward and away from the same, auxiliary grips on said carriage, means for opening and closing the auxiliary grips, links connected to said carriage and having means for engaging the studs on the draw head, and trip means for automatically disengaging the links from said studs at a predetermined point in the travel of the draw head, substantially as described.

7. Rod-drawing apparatus, comprising a reducing die, a reciprocating draw head for pulling the rods through such die, an auxiliary grip carriage mounted in front of said die, actuating connections attached to the auxiliary carriage, means for automatically attaching and detaching said connections with and from the draw head, and means for returning the auxiliary carriage to its initial position when the actuating connections are detached from the draw-head, substantially as described.

8. Rod drawing apparatus, comprising a die, a reciprocating draw-head for pulling the rods through such die and having grips for the rod, an auxiliary grip arranged to force the rods into the die to point them, actuating means for said draw-head and auxiliary grip, means for causing the auxiliary grip to automatically engage and be disengaged from the actuating means, and means for automatically closing the grips on the draw-head upon the rod before the latter is released by the auxiliary grip, substantially as described.

9. Rod drawing apparatus, comprising a draw bar, a die, a main grip for pulling the rods through the die, an auxiliary grip for forcing the rods into the die for pointing, and means for causing the auxiliary grip to retain its hold until after the main grip has been operatively engaged with the pointed end of the rod together with means for then automatically releasing the auxiliary grip, substantially as described.

In testimony whereof, I have hereunto set my hand.

JAMES T. MOLTRUP.